US010380035B2

(12) United States Patent
Ash et al.

(10) Patent No.: US 10,380,035 B2
(45) Date of Patent: Aug. 13, 2019

(54) USING AN ACCESS INCREMENT NUMBER TO CONTROL A DURATION DURING WHICH TRACKS REMAIN IN CACHE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/016,405

(22) Filed: Jun. 22, 2018

(65) Prior Publication Data

US 2018/0300257 A1    Oct. 18, 2018

Related U.S. Application Data

(63) Continuation of application No. 15/169,598, filed on May 31, 2016, now Pat. No. 10,067,883.

(51) Int. Cl.
*G06F 12/00* (2006.01)
*G06F 12/122* (2016.01)
(Continued)

(52) U.S. Cl.
CPC ........ *G06F 12/122* (2013.01); *G06F 12/0811* (2013.01); *G06F 12/0868* (2013.01); *G06F 12/0871* (2013.01); *G06F 12/123* (2013.01); *G06F 12/124* (2013.01); *G06F 12/0804* (2013.01); *G06F 2212/1044* (2013.01); (Continued)

(58) Field of Classification Search
None
See application file for complete search history.

(56) References Cited

U.S. PATENT DOCUMENTS 7,290,099 B2  10/2007 Budaya et al.
8,566,522 B2  10/2013 Shea
(Continued)

OTHER PUBLICATIONS

U.S. Appl. No. 15/169,598, filed May 31, 2016.
(Continued)

*Primary Examiner* — Midys Rojas
(74) *Attorney, Agent, or Firm* — David W. Victor; Konrad Raynes Davda & Victor LLP

(57) ABSTRACT

Provided are a computer program product, system, and method for using an access increment number to control a duration during which tracks remain in cache. Tracks in a storage in the cache are indicated in a cache list. For each of the tracks indicated in the cache list, an access value is updated when one of the tracks is accessed in the cache. An access to a track in the cache indicated in the cache list is received. A determination is made as to whether an access increment number for the accessed track, wherein the access increment number is greater than one. The access value for the accessed track is incremented by the determined access increment number in response to the track being accessed in the cache. The access value for one of the tracks is used to determine whether to initiate to demote the track from the cache.

21 Claims, 7 Drawing Sheets

(51) Int. Cl.
　　　*G06F 12/123*　　　(2016.01)
　　　*G06F 12/0811*　　(2016.01)
　　　*G06F 12/0871*　　(2016.01)
　　　*G06F 12/0868*　　(2016.01)
　　　*G06F 12/0804*　　　(2016.01)

(52) U.S. Cl.
　　　CPC .. *G06F 2212/312* (2013.01); *G06F 2212/462*
　　　　　　　　(2013.01); *G06F 2212/6046* (2013.01)

(56) References Cited

U.S. PATENT DOCUMENTS

2016/0140053 A1　　5/2016　Ash et al.
2017/0344493 A1　　11/2017　Ash et al.

OTHER PUBLICATIONS

Office Action dated Oct. 19, 2017, pp. 13, for U.S. Appl. No. 15/169,598, filed May 31, 2016.
Response dated Jan. 19, 2018, pp. 13, to Office Action dated Oct. 19, 2017, pp. 13, for U.S. Appl. No. 15/169,598, filed May 31, 2016.
Notice of allowance dated May 3, 2018, pp. 5, for U.S. Appl. No. 15/169,598, filed May 31, 2016.
List of IBM Patents or Patent Applications Treated as Related dated Jun. 22, 2018, pp. 2.

Cache Expunge Request

USING AN ACCESS INCREMENT NUMBER TO CONTROL A DURATION DURING WHICH TRACKS REMAIN IN CACHE

BACKGROUND OF THE INVENTION

1. Field of the Invention

The present invention relates to a computer program product, system, and method for using an access increment number to control a duration during which tracks remain in cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

When an application accesses a track in the cache, a track identifier of the accessed cache needs to be moved to the MRU end of the LRU list. To move a track identifier to the MRU end, a lock needs to be obtained on the LRU list. If multiple processes are trying to access the cache, then contention for the LRU list lock among the multiple processes may delay cache processing. One technique for reducing lock contention is to limit the number of times an access track is moved to the MRU end of the LRU list. To limit the number of times a track is moved to the MRU end when being accessed, an access count indicating a number of times a track has been accessed while in the LRU list is maintained, and the track is moved to the MRU end when the access count Modulo N is zero. In this way, the track is moved to the MRU end every N accesses, thus reducing the lock contention to move the track to the MRU end by a factor of N.

When cache is full, tracks need to be demoted, i.e., removed from cache, to make room for newly accessed tracks. The LRU lists are scanned to determine unmodified tracks to move to a demote ready LRU list from where the tracks are demoted, i.e., removed, from cache.

There is a need in the art for improved techniques for selecting tracks for demotion from the cache.

SUMMARY

Provided are a computer program product, system, and method for using an access increment number to control a duration during which tracks remain in cache. Tracks in a storage stored in the cache are indicated in a cache list. For each of the tracks indicated in the cache list, an access value is indicated that is updated when one of the tracks is accessed in the cache. An access to a track in the cache indicated in the cache list is received. A determination is made as to whether an access increment number for the accessed track, wherein the access increment number is greater than one. The access value for the accessed track is incremented by the determined access increment number in response to the track being accessed in the cache. The access value for one of the tracks is used to determine whether to initiate to demote the track from the cache.

DETAILED DESCRIPTION

To optimize performance, applications may prefer that certain types of data remain in cache longer than other types because application performance can be significantly impacted if a cached track is not in cache when needed, even though the infrequent access to the track results in the track being demoted from the cache. For instance, a metadata track maintains information on numerous customer tracks, such as 1000, and the application may need the one metadata track to process the customer tracks. However, given that the presence of a track in cache may be very brief, an application may not be able to access the metadata track in cache before it is demoted and the application will experience cache misses, a cost which can be significant for certain types of data, such as metadata.

Described embodiments address the problem of certain important types of tracks being demoted too soon by allowing the application to provide an access increment number indicating an amount by which an access value is incremented each access. A track is not demoted unless the access value is zero and the access value is incremented by the access increment number each time the track is accessed. If the track is not demoted, then it may be moved to the MRU end of an active LRU cache list and the access value decremented. Setting an access increment number greater than one allows the track to remain in cache by a factor of the access increment number because each access increases the access value by the access increment number greater than one, whereas moving the track from the LRU end to the MRU end only decrements the access value by one.

With the described embodiments, applications can assign access increment numbers to different types of data to increase the duration during which certain types of data, such as metadata, remain in cache to optimize operations, where a higher access increment number maintains the data in cache longer than a lower value. Further embodiments provide techniques for an application to expunge from cache a track no longer needed to avoid the track unnecessarily consuming cache resources for an extended time due to the access increment number.

Figure 1:
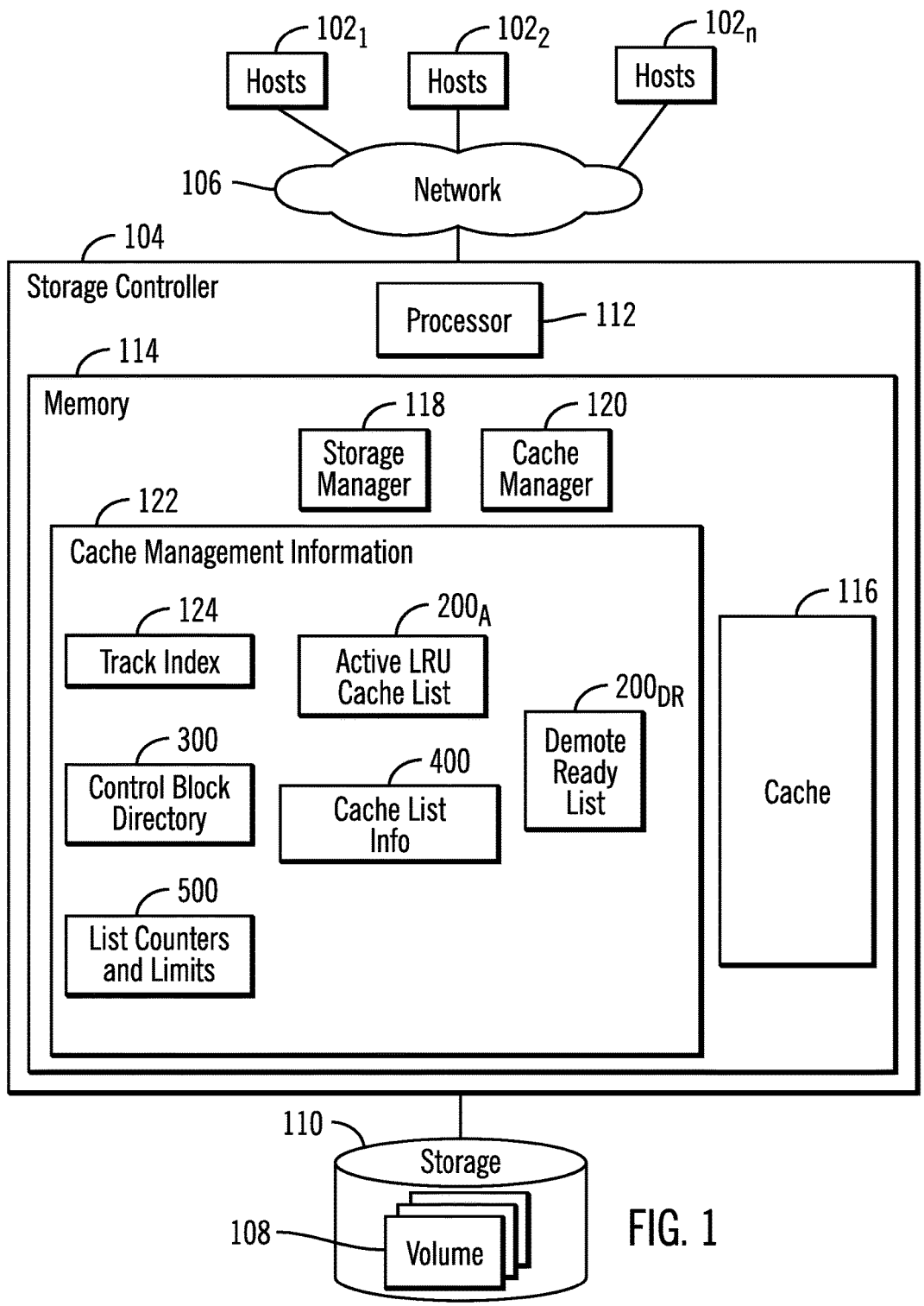
FIG. 1 illustrates an embodiment of a computing environment.

FIG. 1 illustrates an embodiment of a computing environment. A plurality of hosts $102_1, 102_2 \ldots 102_n$ may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts $102_1, 102_2 \ldots 102_n$ and volumes 108 in the storage 110.

The memory 114 further includes a storage manager 118 for managing the transfer of tracks transferred between the hosts $102_1, 102_2 \ldots 102_n$ and the storage 110 and a cache manager 120 that manages data transferred between the hosts $102_1, 102_2 \ldots 102_n$ and the storage 110 in the cache 116. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300, an active Least Recently Used (LRU) cache list $200_A$ indicating active tracks in the cache 116; and a demote ready list $200_{DR}$ indicating a plurality of unmodified tracks that are ready to be demoted, i.e., removed, from the cache 116. The control block directory 300 includes the cache control blocks, where there is one cache control block for each track in the cache 116 providing metadata on the track in the cache 116. The track index 124 associates tracks with the cache control blocks providing information on the tracks in the cache.

In one embodiment, the active LRU cache list $200_A$ may indicate unmodified and modified data, customer data, and metadata for customer data maintained in the cache. Each metadata track may provide information on numerous customer data tracks in the storage 110.

The cache management information 122 further includes cache list information 400 providing information on the active LRU active cache list $200_A$, including thresholds and other parameters used to manage the entries in the LRU active cache list $200_A$.

The cache manager 120 may periodically scan the active LRU cache list $200_A$ to locate unmodified tracks to move to a demote ready list $200_{DR}$ from which tracks are demoted from the cache 116. When a track is demoted it is removed from cache 116, or be invalidated so it can be overwritten.

The storage manager 118 and cache manager 120 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1, 102_2 \ldots 102_n$ may connect to the storage controller 104 over a bus interface, such as a Peripheral Component Interconnect (PCI) bus interface and other interfaces known in the art.

Figure 2:
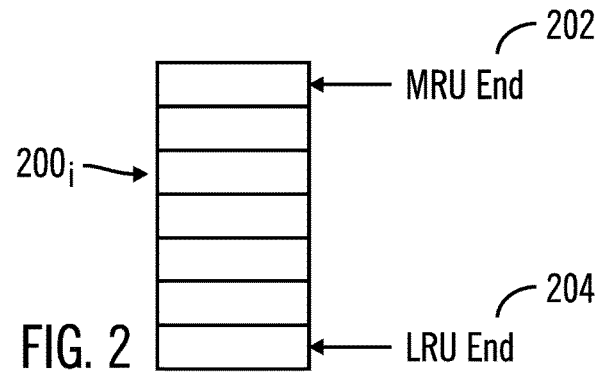
FIG. 2 illustrates an embodiment of a Least Recently Used (LRU) list.

FIG. 2 illustrates an embodiment of the lists $200_A, 200_{DR}$, each as a Least Recently Used (LRU) list, having a most recently used (MRU) end 202 identifying a track most recently added to the cache 116 or most recently accessed in the cache 116 and a least recently used (LRU) end 204 from which the track identified at the LRU end 204 is selected to demote from the cache 116. The LRU end 204 points to a track identifier, such as a track identifier address or a cache control block index for the track, of the track that has been in the cache 116 the longest for tracks indicated in that list $200_A, 200_{DR}$. As a track is added to the MRU end 202, other tracks move downward toward the LRU end 204. If there is not sufficient space for the track being added to the MRU end 202, then a track may be demoted from the LRU end 204 to make room for the new track being added.

Figure 3:
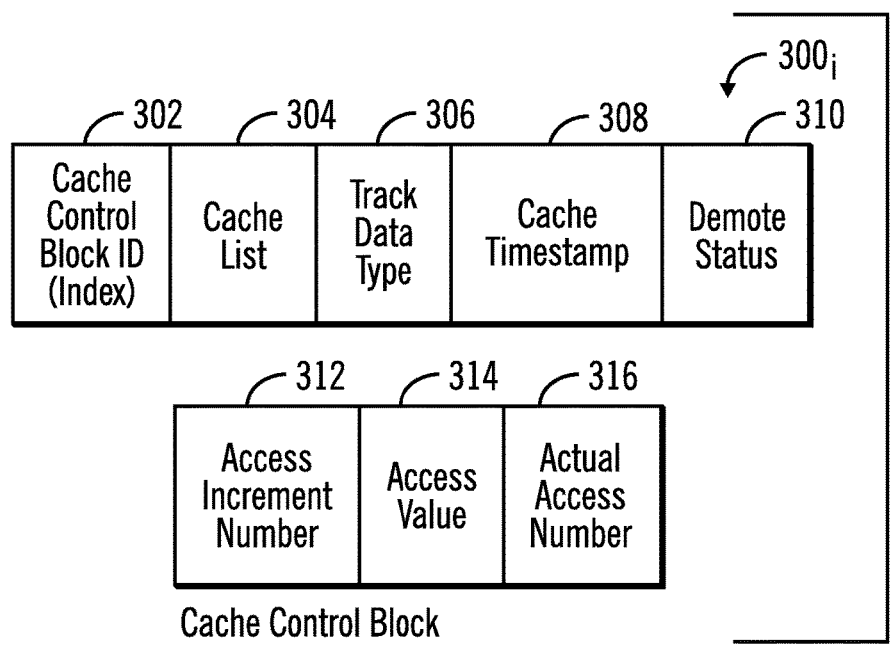
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the LRU list 304, e.g., one of LRU lists $200_A, 200_{DR}$ in which the track associated cache control block $300_i$ is indicated; a track data type 306, such as unmodified sequentially accessed track, unmodified non-sequentially accessed track, etc.; a cache timestamp 308 indicating a time the track was added to the cache 116; a demote status 310 indicating whether the track identified by the cache control block $300_i$ is to be demoted from the cache 116 and indicated in the demote ready LRU list $200_{DR}$, an access increment number 312 comprising a number by which to increment the access value 314 in response to accessing the track identified by the cache control block 302; and an actual access number 316 indicating an actual number of times the track has been accessed since being added to the cache 116 and available on the active LRU cache list $200_A$.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figures 4, 5:
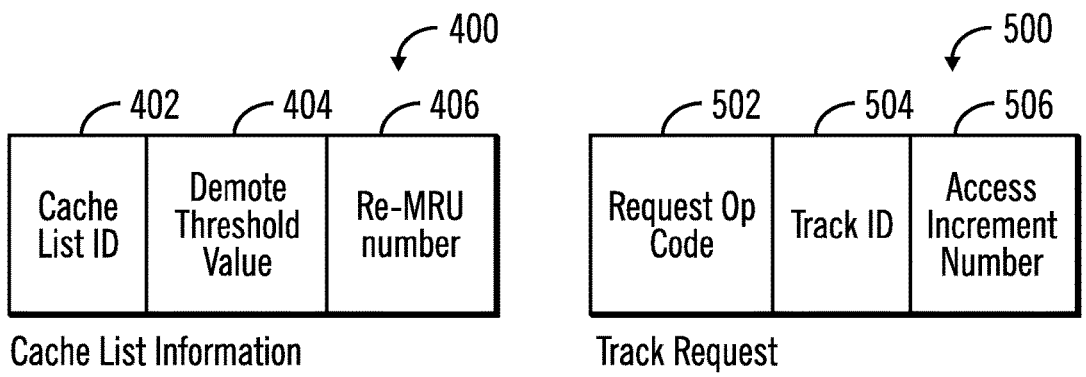
FIG. 4 illustrates an embodiment of cache list information.
FIG. 5 illustrates an embodiment of a track request.

FIG. 4 illustrates an embodiment of cache list information 400, maintained for the active LRU cache list $200_A$ of parameters used to manage tracks in the cache 116, including, but not limited to, a cache list identifier (ID) 402; a demote threshold value 404, such that a track at the LRU end 204 may be demoted when the access value 314 for the track exceeds the demote threshold value 404; and an re-MRU number 406 indicating a number of times a track is accessed since being at the MRU end 202 of the active LRU cache list $200_A$ before that track may be moved to the MRU end 202 of the active LRU cache list $200_A$.

FIG. 5 illustrates an embodiment of a track request sent by one of the hosts $102_1$, $102_2$ . . . $102_n$ including a request operation (op) code 502 indicating a read or write request; a track identifier (ID) 504 identifying the track to access; and an access increment number 506 indicating a number by which to increment the access value 314, where a higher number maintains the track in the cache 116 longer than a lower number 506. In this way, the application submitting the track request 500 can indicate parameters to control how long a track can remain in track before being demoted.

Figure 6A:
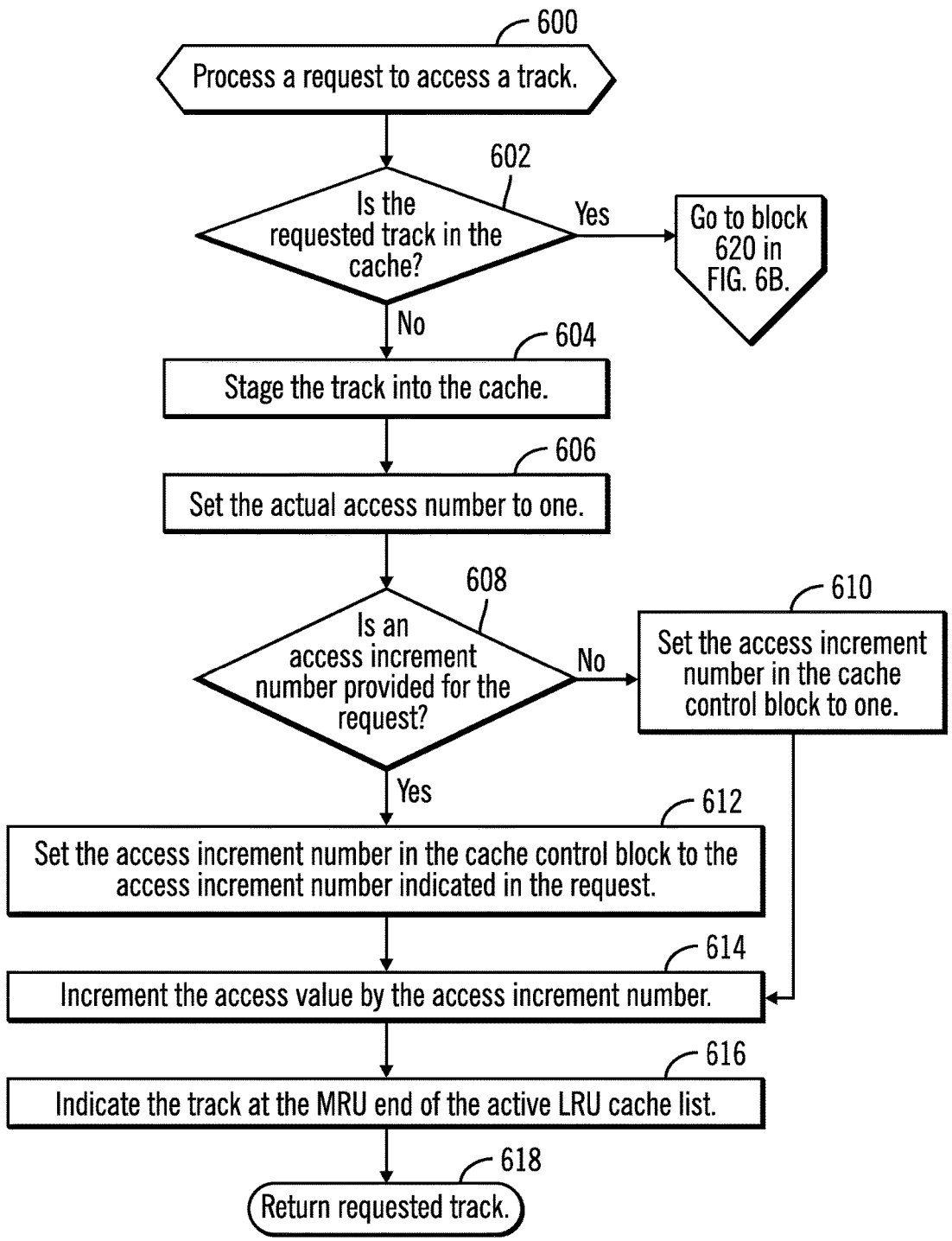
FIGS. 6a and 6b illustrate an embodiment of operations to process a request for a track.
Figure 6B:
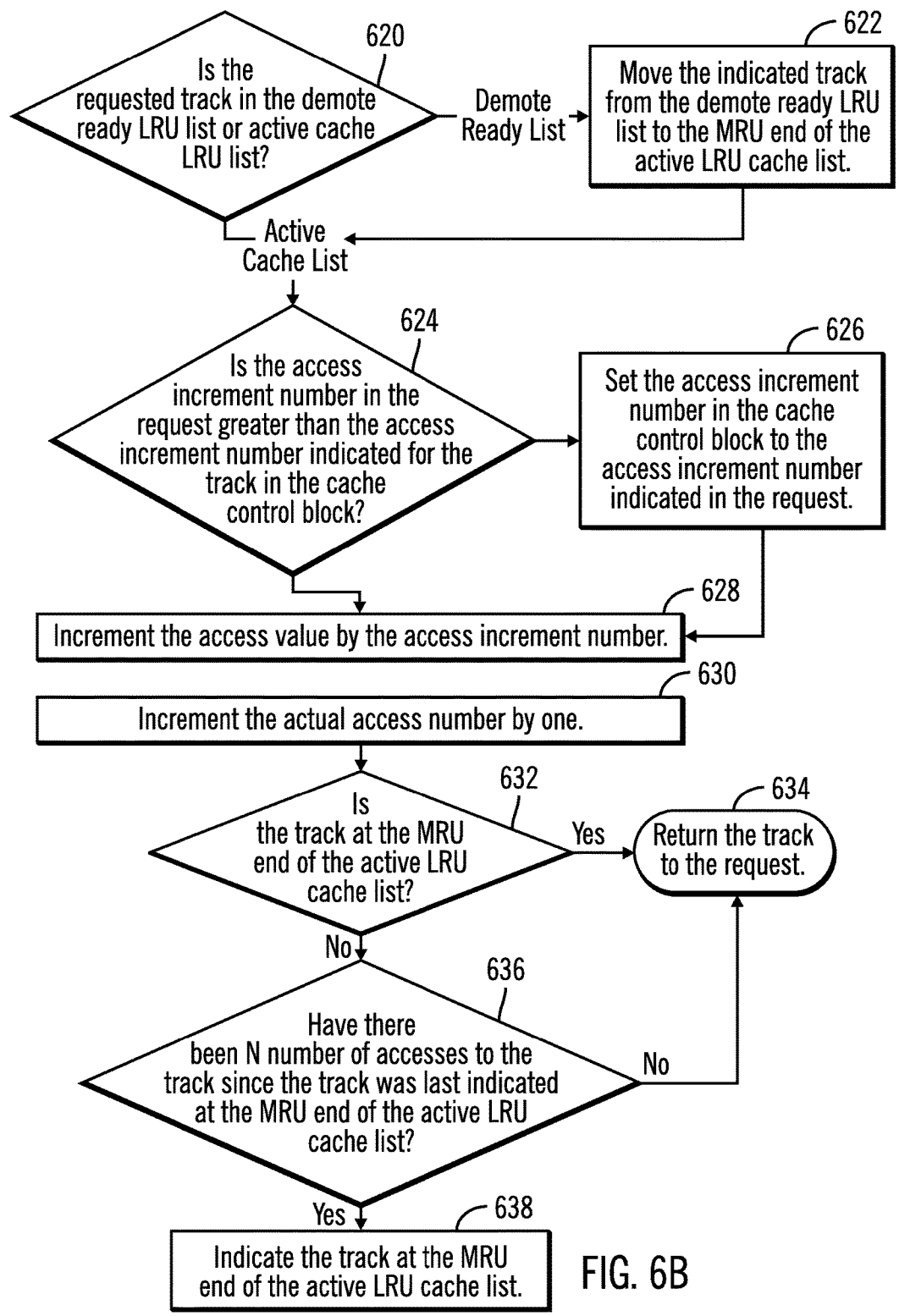

FIGS. 6a and 6b illustrate an embodiment of operations performed by the cache manager 120 to process a request 500 for a track. Upon receiving (at block 600) a request 500 for a track, if (at block 602) the requested track 504 is not currently in the cache 116, not indicated in the active LRU cache list $200_A$ nor the demote ready LRU list $200_{DR}$, then the cache manager 120 stages (at block 604) the track from the storage 110 into the cache 116 and sets (at block 606) the actual access number 316 to one for the track. If (at block 608) the request 500 does not include an access increment number 506, then the access increment number 312 in the cache control block $300_i$ of the requested track 504 is set (at block 610) to one or another default value. If (at block 608) an access increment number 506 is included in the request 500, then the access increment number 312 in the cache control block $300_i$ is set (at block 612) to the access increment number 506 indicated in the request 500. The access value 314 is incremented (at block 614) by the access increment number 312 for the track. The track is indicated (at block 616) at the MRU end 202 of the active LRU cache list $200_A$ and the requested track is returned (at block 618) to the host $102_1$, $102_2$ . . . $102_n$ that submitted the request 500.

If (at block 602) the requested track 504 is in the cache 116, which may be determined if the requested track is indicated in the active cache LRU list $200_A$ or the demote ready LRU list $200_{DR}$, then control proceeds to block 620 in FIG. 6b where the cache manager 120 determines (at block 620) whether the requested track is indicated in the demote ready LRU list $200_{DR}$ or the active LRU cache list $200_A$. If (at block 620) the requested track is indicated in the demote ready LRU list $200_{DR}$, which may be determined by checking the cache list 504 and demote status 510, then the cache manager 120 moves (at block 622) the indicated track from the demote ready LRU list $200_{DR}$ to the MRU end 202 of the active LRU cache list $200_A$.

If (at block 620) the requested cache is on the active LRU cache list $200_A$ from block 620 or 622, then the cache manager 120 determines (at block 624) whether the access increment number 506 in the request 500 is greater than the access increment number 312 indicated for the track in the cache control block $300_i$. If so, then the access increment number 312 in the cache control block 300, is set (at block 626) to the access increment number 506 indicated in the request 500. In this way, if a subsequent request 500 to a same track in the cache 116 has a higher access increment number, than the access increment number 312 is increased to cause the track to remain in cache longer. However, if the subsequent request 500 has a lower access increment number 506, then the access increment number 312 is not lowered so as to not cause the track to be demoted sooner than would occur with a the higher previous access increment number, which may frustrate the needs of the earlier request 500 requiring a higher access increment number 506.

From block 626, after increasing the access increment number 312 or from block 624 if the access increment number 312 is not adjusted, then the access value 314 is incremented (at block 628) by the access increment number 312 and the actual access number 316 is incremented (at block 630) by one. If (at block 632) the requested track is already at the MRU end 202 of the active LRU cache list $200_A$, then the requested track is returned (at block 634) to the requesting host. Otherwise, if (at block 632) the track is not at the MRU end 202, then the cache manager 120 determines (at block 636) whether there have been a preselected N number of accesses to the track while in the cache 116 since the track was last indicated at the MRU end 202 of the active LRU cache list $200_A$. This determination may be made if the (actual access number 316) modulo N is zero. If (at block 636) the track has been accessed N times since last at the MRU end 202, then the track is indicated (at block 638) at the MRU end 202 of the active LRU cache list $200_A$. If (at block 636) the track has not been accessed N times since last at the MRU end 202, then the track is returned (at block 634) and left at its current location in the LRU cache list $200_A$, without being moved to the MRU end 202.

Figure 7:
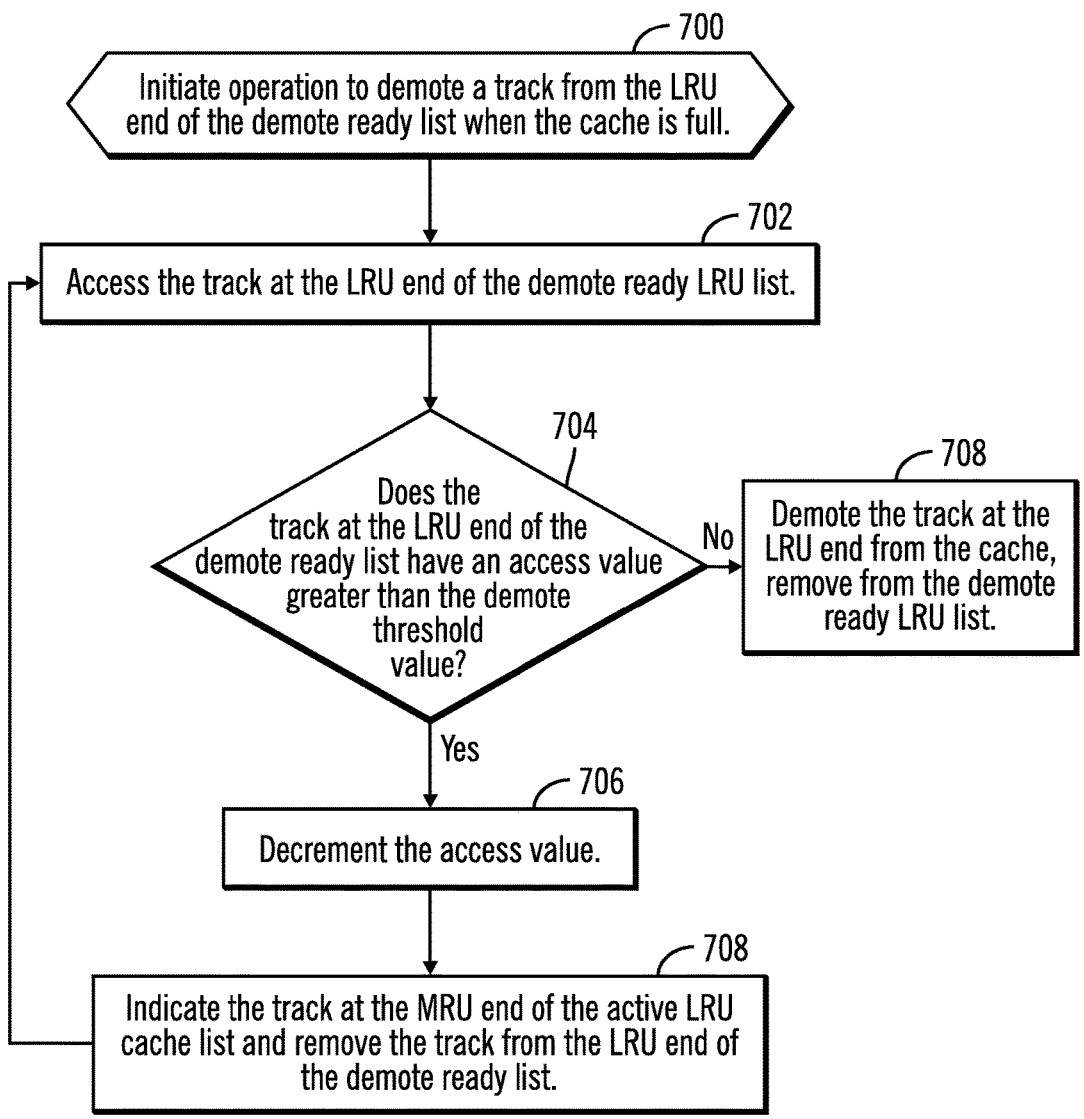
FIG. 7 illustrates an embodiment of operations to demote a track from the cache.

FIG. 7 illustrates an embodiment of operations performed by the cache manager 120 to use the access increment number 312, set according to the operations of FIGS. 6a, and 6b, to determine whether to demote a track once a track has reached the LRU end 204 of the demote ready list $200_{DR}$. Upon initiating (at block 700) an operation to demote a track at the LRU end 204 of the demote ready LRU list $200_{DR}$ when the cache 116 is full or at a threshold level, the cache manager 120 accesses (at block 702) the track indicated at the LRU end 204 of the demote ready list $200_{DR}$. The cache manager 120 determines (at block 704) whether the track at the LRU end 204 of the demote ready LRU list $200_{DR}$ has an access value 314 greater than the demote threshold value 404, e.g., one. If so, then the track still has a sufficient level of access to not be demoted and the access value 314 is decremented (at block 704) and the track is indicated (at block 706) at the MRU end 202 of the active LRU cache list $200_A$. Control then returns to block 702 to attempt to select another track at the LRU end 204 to demote.

If (at block 704) the track at the LRU end 204 has an access value 314 equal to zero, then the track has reached the LRU end 204 a sufficient number of times to have its access value 314 decremented to zero without being accessed, which would increase its access value 314 by the access increment number 312 to offset the decrementing operation at block 706. In such case, the track is indicated (at block 708) at the MRU end 202 of the active LRU cache list $200_A$ and removed from the demote ready LRU list $200_{DR}$.

With the operations of FIGS. 6a, 6b, and 7, different applications may provide different access increment numbers 506 for use with tracks in cache 116 to alter how long tracks remain in cache 116. Further, certain applications may use different access increment numbers 506 for different types of data to cause certain types of data to remain in cache 116 longer or shorter than other types of data. For instance, an application requiring metadata to optimize operations may submit an access increment number 506 for metadata that is greater than the access increment number provided for customer data so that metadata stays in cache 116 longer than customer data. Similar distinctions may be made for other types of data required by the application to optimize performance. The described embodiments cause a track to remain in cache 116 longer by incrementing the access value 314 by a greater amount, i.e., the access increment number 312, then the amount the access value 314 is decremented when reaching the LRU end 204. Thus, each of T accesses resulting in the access value 314 increasing by M, the access increment number 312, will cause the track to at least be moved from the LRU end 204 of the demote ready list $200_{DR}$ to the MRU end 202 of the active LRU cache list $200_A$ T*M times before being demoted. In this way, increasing the access increment number 312 increases the number of times a track avoids demotion and is added back to the MRU end 202 of the active LRU cache list $200_A$ by a factor of M.

Figure 8:
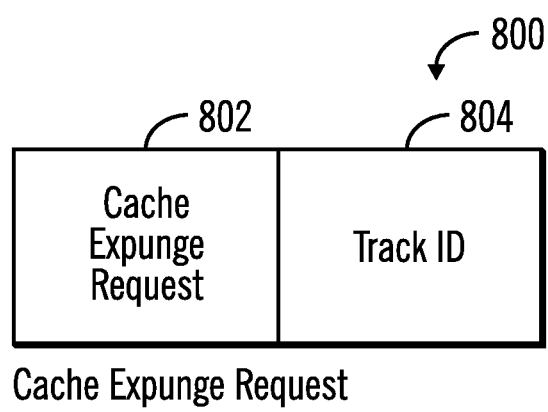
FIG. 8 illustrates an embodiment of a cache expunge request to cause a track to be demoted from cache.

FIG. 8 illustrates an embodiment of a cache expunge request 800 that the hosts $102_1$, $102_2$ ... $102_n$ may submit to cause the cache manager 120 to remove a track from cache. The request 800 includes a cache expunge request code 802 and a track identifier (ID) 804 of the track to expunge. This request 800 causes the cache manager 120 to immediately move indication of the track 804 to the MRU end 202 of the demote ready list $200_{DR}$ if the track 804 is on the active LRU cache list $200_A$. If the track is already on the demote ready LRU list $200_{DR}$, then it would just remain there for demotion. With this expunge request 800, an application that assigned a high access increment number 312 to prevent a track from being demoted may then cause that track to be demoted by adding the track to the demote ready LRU list $200_{DR}$ so that it does not remain in the cache 116 for a long time based on the access increment number 312 and unnecessarily consume cache resources.

Described embodiments provide techniques to cause a track to remain in cache longer by providing an access increment number greater than one to cause the track not to be demoted when the track reaches the LRU end of the demote ready LRU list until after reaching the LRU end of the demote ready LRU list a multiple number of times without receiving an access to the track. Described embodiments allow applications to specify different access increment numbers for different types of data to cause different types of tracks to remain in cache for different periods of time by delaying the demotion of the track using the access increment value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the hosts $102_1$, $102_2$ ... $102_n$ and storage controller 104, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

Figure 9:
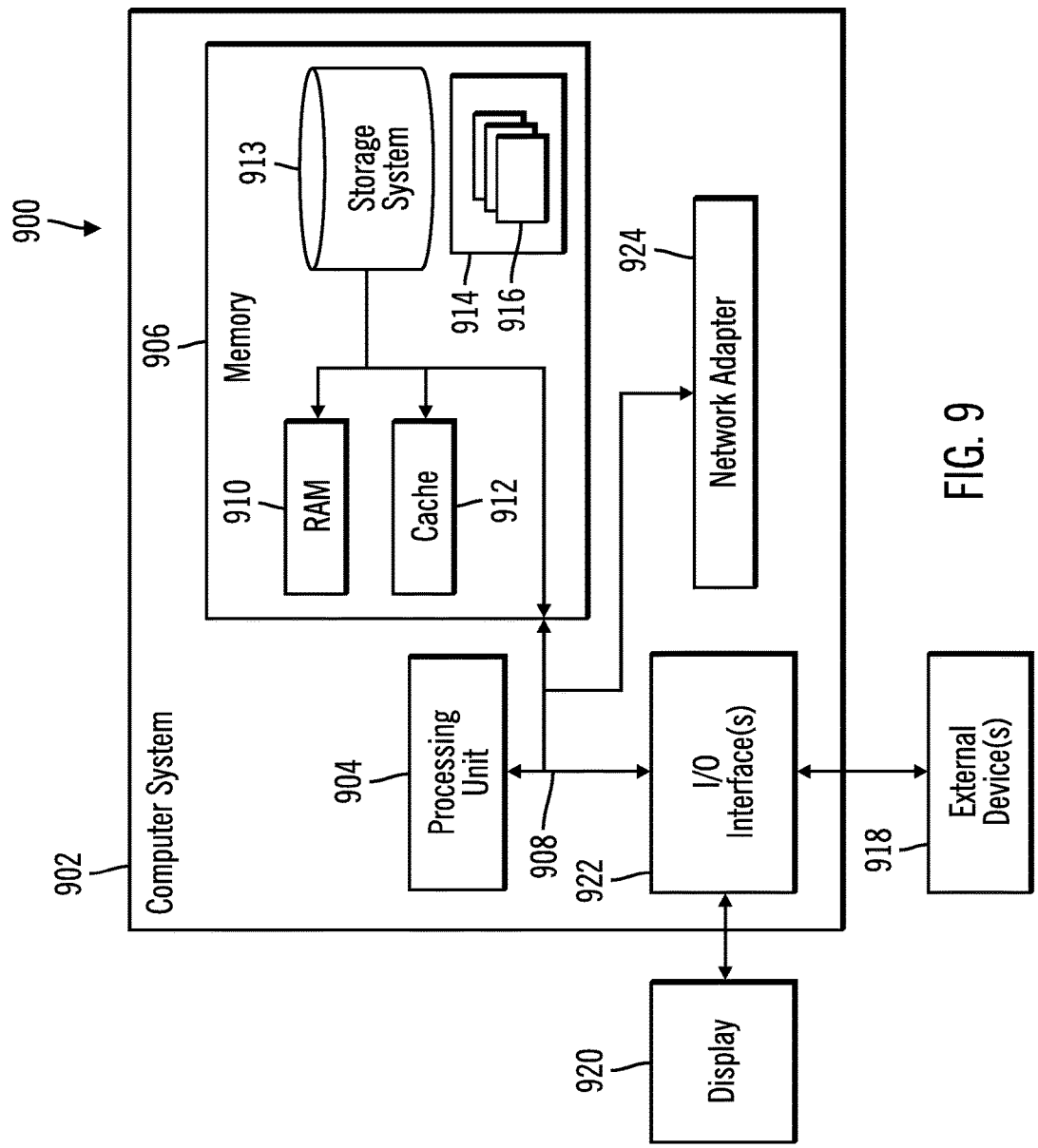
FIG. 9 illustrates a computing environment in which the components of FIG. 1 may be implemented

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:

receiving an application access increment number provided by an application for a track in the cache, wherein the application access increment number comprises one of a plurality of values used to control a duration during which the track is maintained in the cache;

in response to a request for the track in the cache, incrementing an access value for the track by the application access increment number; and using the access value for the track in the cache to determine whether to demote the track from the cache.

2. The computer program product of claim 1, wherein the operations further comprise:

receiving a request for the track from the application, wherein the request includes the application access increment number.

3. The computer program product of claim 2, wherein the operations further comprise:

incrementing the access value for the track by a default value in response to the request for the track not including the application access increment number.

4. The computer program product of claim 1, wherein the plurality of values for the application access increment number are used for different types of data, wherein a higher access increment number is used for a first type of data to cause the first type of data to remain in the cache longer than a second type of data for which a lower access increment number is used, wherein the lower access increment number is less than the higher access increment number.

5. The computer program product of claim 4, wherein the first type of data comprises metadata and wherein the second type of data comprises consumer data, wherein the metadata provides metadata for multiple tracks of consumer data.

6. The computer program product of claim 1, wherein the operations further comprise:

moving unmodified tracks in the cache indicated in a cache list, indicating tracks in the storage stored in the cache, to a demote ready list of tracks;

using the access value for a track in the demote ready list considered for demotion to determine whether to maintain the track considered for demotion in the cache; and in response to determining that the access value indicates to move the track considered for demotion to the cache list, removing indication of the track considered for demotion from the demote ready list and adding indication of the track considered for demotion to the cache list.

7. The computer program product of claim 1, wherein the operations further comprise:

determining whether there have been N number of accesses to a track in the cache since the track was last indicated at a most recently used (MRU) end of a cache list indicating tracks in the storage stored in the cache, wherein a track in cache that is accessed is indicated at the MRU end of the cache list; and indicating the track at the MRU end of the cache list in response to determining that there have been N number of accesses to the track since the track was last indicated at the MRU end of the cache list.

8. A system for managing tracks in a storage in a cache, comprising:

a processor;

a memory including a cache;

a computer readable storage medium having computer readable program code embodied therein that when executed performs operations, the operations comprising:

receiving an application access increment number provided by an application for a track in the cache, wherein the application access increment number comprises one of a plurality of values used to control a duration during which the track is maintained in the cache;

in response to a request for the track in the cache, incrementing an access value for the track by the application access increment number; and using the access value for the track in the cache to determine whether to demote the track from the cache.

9. The system of claim 8, wherein the operations further comprise:

receiving a request for the track from the application, wherein the request includes the application access increment number.

10. The system of claim 9, wherein the operations further comprise:

incrementing the access value for the track by a default value in response to the request for the track not including the application access increment number.

11. The system of claim 8, wherein the plurality of values for the application access increment number are used for different types of data, wherein a higher access increment number is used for a first type of data to cause the first type of data to remain in the cache longer than a second type of data for which a lower access increment number is used, wherein the lower access increment number is less than the higher access increment number.

12. The system of claim 11, wherein the first type of data comprises metadata and wherein the second type of data comprises consumer data, wherein the metadata provides metadata for multiple tracks of consumer data.

13. The system of claim 8, wherein the operations further comprise:

moving unmodified tracks in the cache indicated in a cache list, indicating tracks in the storage stored in the cache, to a demote ready list of tracks;

using the access value for a track in the demote ready list considered for demotion to determine whether to maintain the track considered for demotion in the cache; and in response to determining that the access value indicates to move the track considered for demotion to the cache list, removing indication of the track considered for demotion from the demote ready list and adding indication of the track considered for demotion to the cache list.

14. The system of claim 8, wherein the operations further comprise:

determining whether there have been N number of accesses to a track in the cache since the track was last indicated at a most recently used (MRU) end of a cache list indicating tracks in the storage stored in the cache, wherein a track in cache that is accessed is indicated at the MRU end of the cache list; and indicating the track at the MRU end of the cache list in response to determining that there have been N number of accesses to the track since the track was last indicated at the MRU end of the cache list.

15. A method for managing tracks in a storage in a cache, comprising:

receiving an application access increment number provided by an application for a track in the cache, wherein the application access increment number comprises one of a plurality of values used to control a duration during which the track is maintained in the cache;

in response to a request for the track in the cache, incrementing an access value for the track by the application access increment number; and using the access value for the track in the cache to determine whether to demote the track from the cache.

16. The method of claim 15, further comprising:

receiving a request for the track from the application, wherein the request includes the application access increment number.

17. The method of claim 16, further comprising:

incrementing the access value for the track by a default value in response to the request for the track not including the application access increment number.

18. The method of claim 15, wherein the plurality of values for the application access increment number are used for different types of data, wherein a higher access increment number is used for a first type of data to cause the first type of data to remain in the cache longer than a second type of data for which a lower access increment number is used, wherein the lower access increment number is less than the higher access increment number.

19. The method of claim 18, wherein the first type of data comprises metadata and wherein the second type of data comprises consumer data, wherein the metadata provides metadata for multiple tracks of consumer data.

20. The method of claim 15, further comprising:

moving unmodified tracks from in the cache indicated in a cache list, indicating tracks in the storage stored in the cache, to a demote ready list of tracks;

using the access value for a track in the demote ready list considered for demotion to determine whether to maintain the track considered for demotion in the cache; and in response to determining that the access value indicates to move the track considered for demotion to the cache list, removing indication of the track considered for demotion from the demote ready list and adding indication of the track considered for demotion to the cache list.

21. The method of claim 15, further comprising:

determining whether there have been N number of accesses to a track in the cache since the track was last indicated at a most recently used (MRU) end of a cache list indicating tracks in the storage stored in the cache, wherein a track in cache that is accessed is indicated at the MRU end of the cache list; and indicating the track at the MRU end of the cache list in response to determining that there have been N number of accesses to the track since the track was last indicated at the MRU end of the cache list.

* * * * *